United States Patent
Leonardi

(10) Patent No.: US 11,168,483 B2
(45) Date of Patent: Nov. 9, 2021

(54) TEMPORARY CONSTRUCTION ELEMENT STAND OR SUPPORT APPARATUS

(71) Applicant: Chris Leonardi, Primbee (AU)

(72) Inventor: Chris Leonardi, Primbee (AU)

( * ) Notice: Subject to any disclaimer, the term of this patent is extended or adjusted under 35 U.S.C. 154(b) by 0 days.

(21) Appl. No.: 16/312,318

(22) PCT Filed: Jul. 4, 2017

(86) PCT No.: PCT/AU2017/050691
§ 371 (c)(1),
(2) Date: Dec. 21, 2018

(87) PCT Pub. No.: WO2018/006124
PCT Pub. Date: Jan. 11, 2018

(65) Prior Publication Data
US 2019/0330866 A1    Oct. 31, 2019

(30) Foreign Application Priority Data

Jul. 4, 2016 (AU) ............................... 2016902619
Jul. 4, 2016 (AU) ............................... 2016902620

(51) Int. Cl.
*E04G 21/00* (2006.01)
*A47B 47/00* (2006.01)
(Continued)

(52) U.S. Cl.
CPC .............. *E04G 21/00* (2013.01); *A47B 47/00* (2013.01); *A47B 81/00* (2013.01); *B25H 1/0042* (2013.01);
(Continued)

(58) Field of Classification Search
CPC ......... E04G 21/00; A47B 47/00; A47B 81/00; A47B 2220/0036; B25H 1/0042; F16M 11/22
See application file for complete search history.

(56) References Cited

U.S. PATENT DOCUMENTS 2,039,060 A * 4/1936 Cummings ............... E04G 1/28
                                                        182/130
2,297,316 A * 9/1942 Padgett ..................... E04G 1/32
                                                        248/166
(Continued)

FOREIGN PATENT DOCUMENTS

GB          2382026 A      5/2003
WO       2018006124 A1     1/2018

OTHER PUBLICATIONS

International Search Report, by the ISA/AU, dated Oct. 13, 2017, in connection with International Application No. PCT/AU2017/050691.

(Continued)

*Primary Examiner* — Patrick D Hawn
(74) *Attorney, Agent, or Firm* — Bill R. Naifeh

(57) ABSTRACT

A compact, demountable or collapsible, portable stand or support apparatus for providing construction elements, typically scaffolding planks and poles, in a safe and user accessible position. The invention including a demounting connector, specially adapted to removably connect a leaning support to a base, in an apparatus that is assembled for use and can be collapsed or demounted for purposes of storage and/or transport between work sites. The invention seeks to prevent worker injury as a consequence of lifting heavy construction elements off the ground, by placing them in a safe and substantially upright or user-friendly and accessible position prior to their handling.

8 Claims, 10 Drawing Sheets

(51) Int. Cl.
*A47B 81/00* (2006.01)
*B25H 1/00* (2006.01)
*F16M 11/22* (2006.01)

(52) U.S. Cl.
CPC ...... *F16M 11/22* (2013.01); *A47B 2220/0036* (2013.01)

(56) References Cited

U.S. PATENT DOCUMENTS

| | | | | | |
|---|---|---|---|---|---|
| 2,485,165 | A * | 10/1949 | Pollman | ................ | E04G 1/152 182/223 |
| 2,605,074 | A * | 7/1952 | Bucsko | ................ | E04G 5/061 248/235 |
| 2,876,046 | A * | 3/1959 | Owen | ................ | E04G 1/32 182/225 |
| 2,928,443 | A * | 3/1960 | Sevachko | ................ | B25B 5/145 269/221 |
| 3,180,605 | A * | 4/1965 | Ewaskowitz, Jr. | ...... | B44D 3/14 248/231.85 |
| 3,223,370 | A * | 12/1965 | Pignon | ................ | E04G 1/15 248/214 |
| 3,385,400 | A * | 5/1968 | Whitsett | ................ | E04G 5/06 182/150 |
| 3,403,751 | A * | 10/1968 | Yoder | ................ | E04G 5/04 182/229 |
| 3,472,338 | A * | 10/1969 | Olds | ................ | E04G 5/00 182/82 |
| 3,515,244 | A * | 6/1970 | Weiblejohn | ................ | E04G 3/20 182/150 |
| 4,187,929 | A * | 2/1980 | Cyr | ................ | E04G 1/15 182/129 |
| 4,688,685 | A | 8/1987 | Brace | | |
| 4,858,724 | A * | 8/1989 | St-Germain | ................ | E04G 5/14 182/113 |
| 4,984,656 | A * | 1/1991 | Doolittle | ................ | E04G 1/151 182/217 |
| 5,259,477 | A * | 11/1993 | Fears | ................ | E04G 5/06 182/82 |
| 5,441,125 | A * | 8/1995 | Cook | ................ | E04G 3/20 182/82 |
| 5,524,727 | A * | 6/1996 | Yennie, Jr. | ................ | E04G 3/20 182/82 |
| 5,727,647 | A * | 3/1998 | Brantley, Jr. | ................ | E04G 1/151 182/217 |
| 6,076,991 | A * | 6/2000 | Karlsen | ................ | E04G 1/152 403/381 |
| 6,827,181 | B2 * | 12/2004 | Austin | ................ | E04G 1/32 182/150 |
| 7,117,997 | B2 | 10/2006 | Clover | | |
| 7,152,835 | B1 * | 12/2006 | Riblet | ................ | E04G 1/20 248/246 |
| 7,284,738 | B1 * | 10/2007 | Staneart | ................ | E04G 21/16 248/354.1 |
| 8,181,742 | B1 * | 5/2012 | Ranese | ................ | E04G 3/28 182/136 |
| 8,376,291 | B1 | 2/2013 | Groves | | |
| 2005/0006174 | A1 * | 1/2005 | Terzini | ................ | A47B 57/56 182/92 |
| 2008/0264725 | A1 * | 10/2008 | Miles | ................ | E04G 5/06 182/113 |
| 2009/0314729 | A1 | 12/2009 | McCarthy et al. | | |
| 2012/0043160 | A1 * | 2/2012 | Renish | ................ | E04G 5/08 182/129 |
| 2012/0043161 | A1 * | 2/2012 | Renish | ................ | E04G 1/15 182/129 |
| 2016/0108628 | A1 * | 4/2016 | Rourke | ................ | E04G 1/152 182/45 |

OTHER PUBLICATIONS

Written Opinion, by the ISA/AU, dated Oct. 13, 2017, in connection with International Application No. PCT/AU2017/050691.

* cited by examiner

TEMPORARY CONSTRUCTION ELEMENT STAND OR SUPPORT APPARATUS

TECHNICAL FIELD

The present invention relates to the field of scaffolding, falsework and formwork construction. Specifically, the invention comprises a demountable or collapsible stand or support apparatus for assisting in the unloading, assembly and collection of construction elements such as scaffolding, falsework and formwork components. More particularly, the invention seeks to alleviate stress and injury as a consequence of lifting heavy construction elements off the ground, typically scaffolding planks and poles. This, by placing them in an upstanding or substantially upright or user-friendly and accessible position prior to their handling. The commercial benefits of which are directed towards improving the safety and efficiency of operators and users and the possible reduction in consequential work injury related claims.

BACKGROUND TO THE INVENTION

Scaffolding has been utilised in the building and construction industries throughout recorded history and has been assembled from many different materials and in a multitude of ways. Formwork and forms of falsework have also been used for a similar historical period of time.

Scaffolding components tend to be delivered to a construction site as a series of component parts which are transported and delivered on a scaffold delivery pallet. This necessitates construction workers to unpack, carry and assemble the scaffolding parts prior to initiating building work. Other temporary construction elements, such as formwork and falsework, are also delivered to work sites in a similar manner.

The scaffolding or formwork generally comprises planks or tubing of different thicknesses or lengths. By and large, the tubing lengths are referred to as 'standards'. The long horizontal tubes are known as 'ledgers' and the shorter horizontal tubes are known as 'transoms'. These tubes are made from either aluminium or steel, with steel representing the stronger and sturdier option. Correspondingly, when standard-size tubing is used, a length of steel tubing has a mass of approximately 4.5 kilograms per metre length, while aluminium has a mass of just under 2 kilograms per metre length. Although variable in length, the tubing tends to be of a length wherein multiple pieces of tubing will be of significant gross weight. Therefore, the process of loading or unloading a pallet, which involves a significant amount of bending, lifting and carrying, becomes a workplace hazard.

Furthermore, scaffolding working surfaces are constructed by using a series of boards or planks arranged on top of and connected to an assembled framework of tubing. Although the length of scaffolding planks may vary between projects, standard scaffolding planks are usually of a uniform width (approximately 225 mm) and are of one of three thicknesses (38, 50 or 63 mm), with 38 mm being the most common thickness. The scaffolding planks are typically constructed of timber, steel or aluminium. Correspondingly, even the lightest scaffolding plank is still of a substantial weight.

For efficiency purposes, construction workers unpacking a scaffold delivery pallet will tend to carry multiple components simultaneously. This therefore necessitates a series of bending, lifting and carrying activities in handling the construction elements. Furthermore, the inability of being able to use two hands while unpacking and packing of components rather than one, while having to use the other hand to support components already removed or prior to stacking, greatly increases the risk of related joint and muscle strain/fatigue. This obviously represents a workplace hazard and safety issue which has the unfortunate potential to attract and result in expensive employee litigation and compensation.

It is therefore an advantage to provide an apparatus to assist in the loading and unloading of construction elements (typically from a scaffold delivery pallet) which is directed to preventing compensable worker injury as a consequence of heavy lifting. It is also an advantage for this apparatus to be portable and relatively compact, so as to limit the amount of space taken up during its storage or transport between work sites.

SUMMARY OF THE INVENTION

In one aspect, the invention resides in a compact, demountable or collapsible, portable stand or support apparatus for providing construction elements, including scaffolding planks and poles, in an upstanding user accessible position, the stand or support apparatus comprising:

a base for resting on, the construction elements, substantially in an upstanding and slightly leaning position;

a support against which the elements can be leant; the support in an elevated position relative to the base;

a demounting connector, specially adapted to removably connect the support to the base, wherein the stand or support apparatus is assembled for use and can be collapsed or demounted for purposes of storage and/or transport between work sites.

In a preferred embodiment, the base comprises a scaffold delivery pallet and the demounting connector is an arm or tang which attaches the support to an upright tube of the scaffold delivery pallet.

In a preferred example, the support can include a support platform whereby a construction element may be supported and presented to the user in an elevated or raised position.

Preferably, the support is pivotally attached to the base by an upstanding post, pole or leg and wherein the support extends substantially horizontally with respect to the base.

The stand can include a locking mechanism adapted to selectively lock the support at an angle relative to the base. This can comprise a threaded bolt and wingnut arrangement wherein the bolt passes through the support and support post or leg wherein the orientation of the support with respect the base can be adjusted and locked in place by tightening the wingnut. It will be obvious to the skilled addressee that any other fixtures or mechanisms may be adapted for the same purpose.

Preferably, the support is curved, bent or otherwise shaped so as to prevent or limit any lateral or sideways movement of the construction elements leaning against the support.

In a preferred embodiment, the invention can be formed substantially using scaffolding planks wherein the demounting connector is a specially adapted bracket to join one or more first scaffolding planks to comprise the base, to one or more upright second scaffolding planks, comprising the support. In this embodiment, the support may also include an end cap adapted to engage a free end of an upright second scaffolding plank extending from the base. Upon assembly of the base, the end cap is placed over the upper end of a scaffolding plank that forms the support. The end cap preferably includes a set of guides arranged to assist in guiding of construction elements, namely other scaffolding planks and poles, into position so as to rest between the guides. Consistent with this example, the support may also comprise an end cap adapted to engage a free end of a post or leg extending from the base.

An alternative embodiment of the invention comprises a stand or support apparatus wherein the demounting connector comprises a leg mounting boss; the base comprising at least three legs pivotally connected to the leg mounting boss; the legs pivoting between an inwardly collapsed storage configuration and an outwardly splayed self-supporting tripod configuration.

Preferably, the base includes or comprises a component rest tray wherein one or more construction elements with an end placed in the tray can be leant against the support in a substantially upright position.

Preferably, the base or the support has opposed angularly disposed or sloping guides to assist in guiding and placing of the construction elements in the stand or support apparatus.

Preferably, the base or the support is sized to safely hold a limited and predetermined number of construction elements.

Preferably, there are one or more releasable locking mechanisms associated with the base, support or demounting connector to lock any one of them in a desired position.

The construction elements are typically components for assembling formwork, falsework or scaffolding, including scaffolding planks and poles.

BRIEF DESCRIPTION OF THE DRAWINGS

Preferred embodiments of the invention will now be described, by way of example only, with reference to the accompanying drawings in which.

DETAILED DESCRIPTION OF PREFERRED EMBODIMENTS

Figure 1:
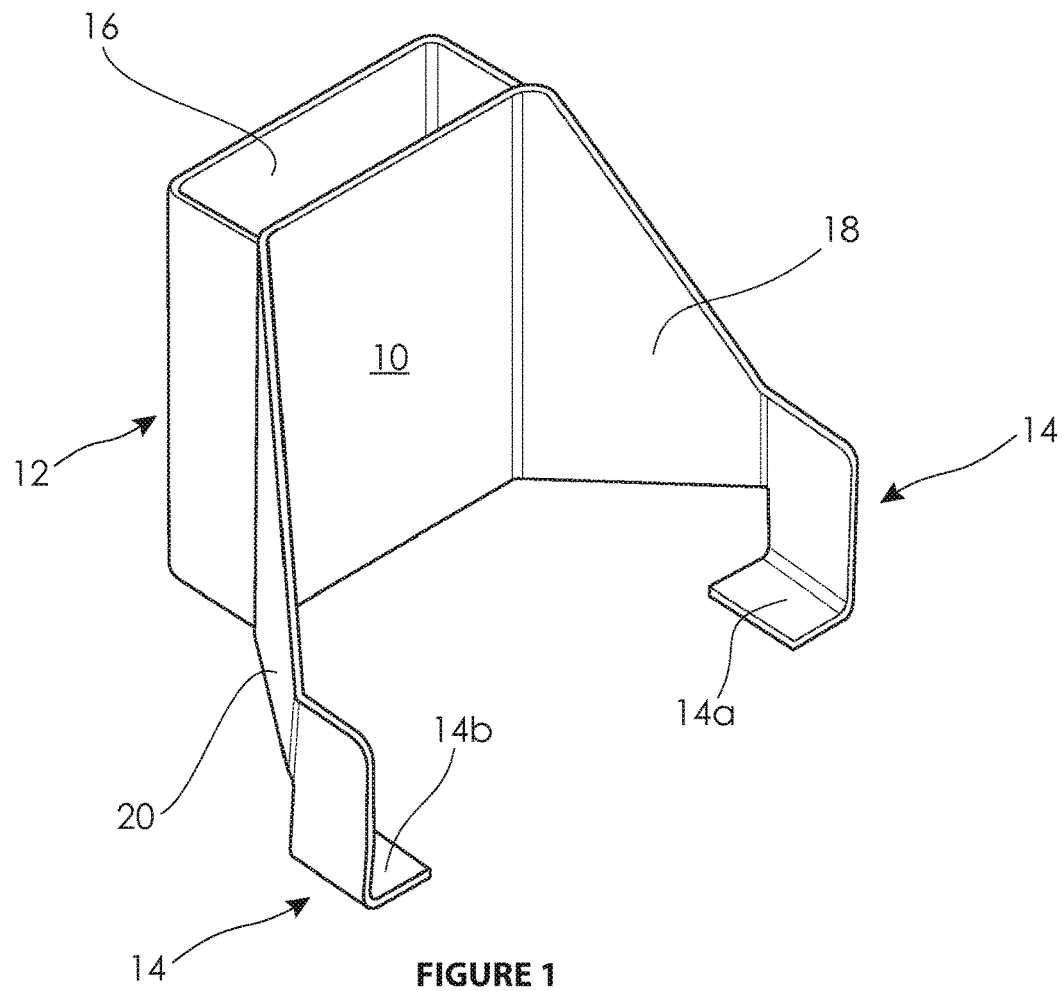
FIG. 1 shows a preferred demounting connector for assembling base and support planks in accordance with the invention.
Figure 3:
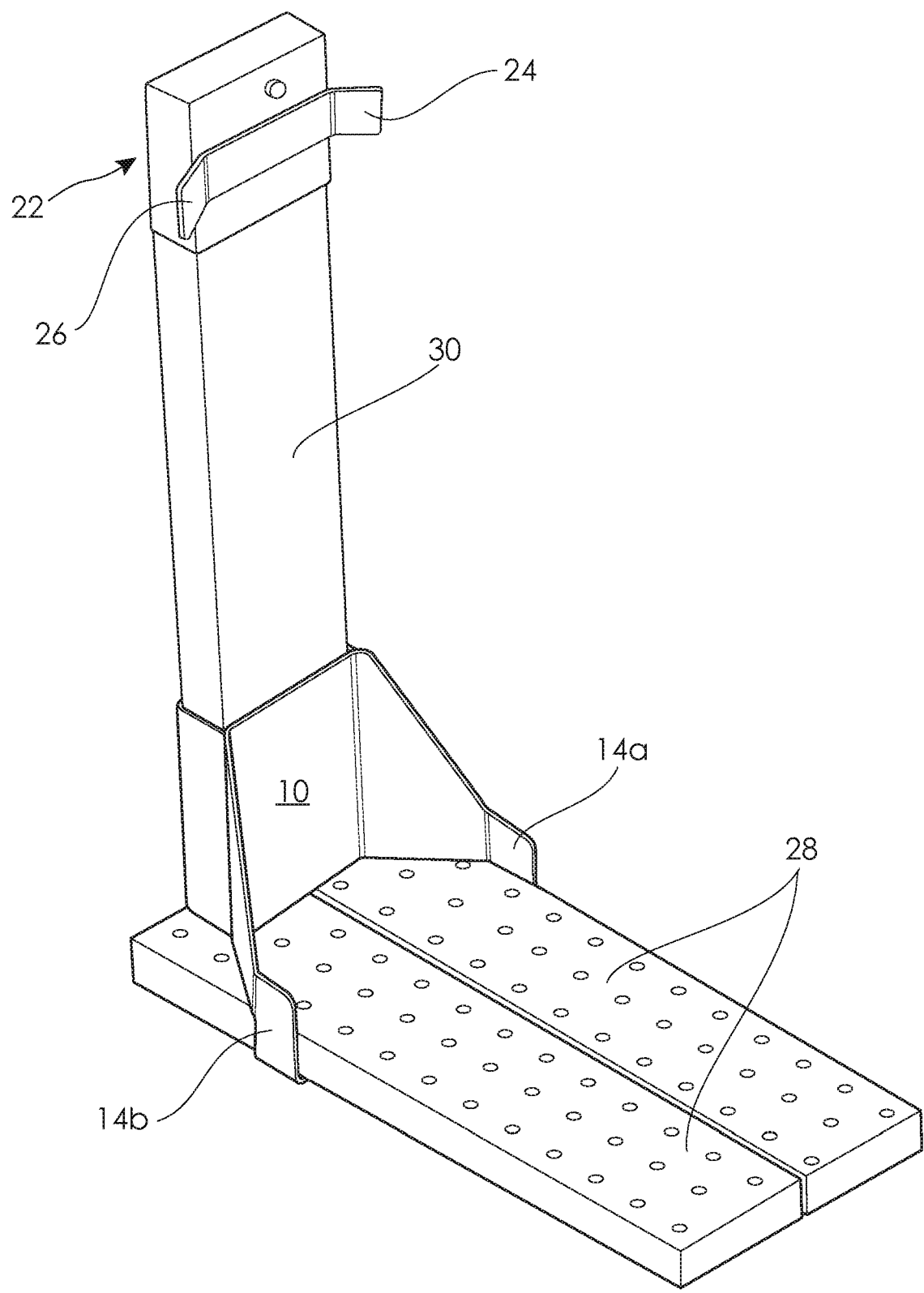
FIG. 3 shows a fully-assembled embodiment of the stand or support apparatus.

FIG. 1 shows a preferred demounting connector 10 for connecting the base and support (which comprise scaffolding planks 28, 30 shown in FIG. 3). Connector 10 is a specially adapted bracket which combines a vertical support portion 12 and a horizontal base portion 14. In this version, horizontal base portion 14 engages with one or more base scaffolding planks (see 28 in FIG. 3), which are inserted between bracket lugs 14a, 14b. The bracket lugs can be dimensioned to typically receive one or more scaffolding planks. In the particular embodiment shown, the bracket lugs 14a, 14b are spaced to receive two standard-width scaffolding planks lain side-by-side. Vertical support portion 12 is dimensioned to allow the insertion of a single standard scaffolding plank (see 30 in FIG. 3).

Vertical support portion 12 comprises rectangular tube 16 extending substantially perpendicularly from horizontal base portion 14 of the connector. Rectangular tube 16 may be formed in the manner shown. Alternatively, a person skilled in the art will appreciate that tube 16 may also be formed by a pair of appropriately dimensioned opposing brackets, channels or flanges.

In the particular embodiment shown, rectangular tube 16 is dimensioned to receive an end of a single, standard-width scaffolding plank (see 30 of FIG. 3). The depth of tube 16 is such that an end of a scaffolding plank inserted into the tube will rest against base planks (28 in FIG. 3) held between bracket lugs 14a, 14b.

In operation, guiding webs 18, 20 act to assist an operator in placing the ends of construction elements such as scaffolding planks and poles (not shown) against the assembled stand or support apparatus shown in FIG. 3. In the particular embodiment shown, guiding webs 18, 20 are formed of solid sheets extending between the hollow tubular support 16 and bracket lugs 14a, 14b. However, a person skilled in the art will appreciate that there is no explicit need for the guiding webs 18, 20 to be of solid sheet and any form of rail, web or sheet material may be adapted and shaped to serve as the guiding means.

Figure 2:
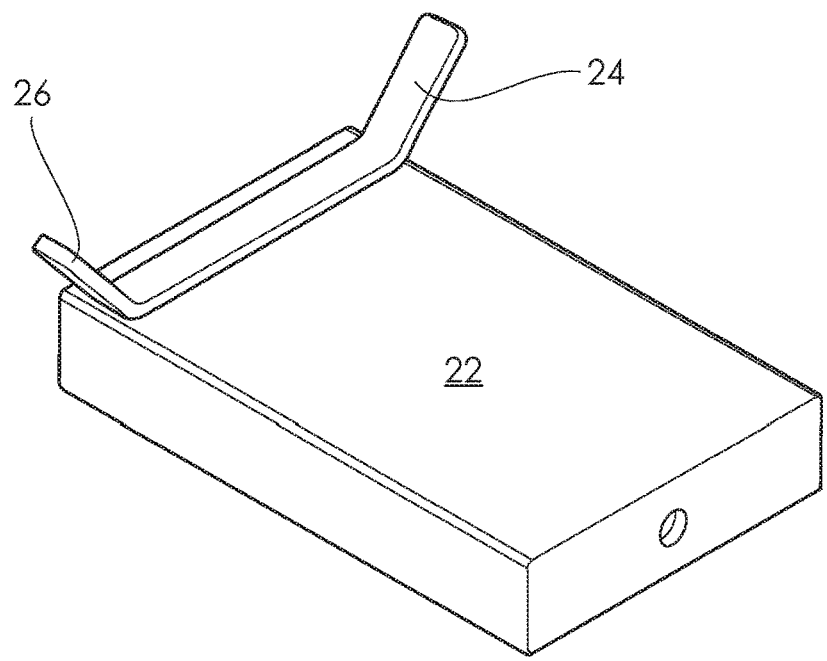
FIG. 2 shows a preferred embodiment of an end cap.

FIG. 2 shows an end cap 22 designed to be used with the connector 10 of FIG. 1. End cap 22 shown in FIG. 2 is formed from a hollow tubular section with a closed off end. End cap 22 is internally dimensioned so as to receive a free end of a scaffolding plank. In operation, end cap 22 is fitted to the free end of an upright scaffolding plank which has been inserted into the demounting connector 10. End cap 22 further includes a pair of guiding structures 24, 26 that act to limit or prevent sideways or transverse movement of the construction elements thereby supported.

FIG. 3 shows a fully-assembled stand or support apparatus utilising the demounting connector 10 and end cap 22 disclosed in FIGS. 1 and 2, respectively. Base 28 is formed from two standard-width scaffolding planks, lain side-by-side and inserted into base bracket lugs 14a, 14b. The support 30 has been formed from a single upright standard-width scaffolding plank that has been inserted into connector 10. End cap 22 is placed on the upper and free end of the upright support plank 30.

When fully assembled as shown, additional construction elements can be supported by the stand such that one end will rest on the base 28 and the other end will rest against upright support plank 30 or end cap 22, depending on the length of the particular component. Splayed guides 24, 26 assist in the placement and transverse retention of the temporary construction elements (not shown) resting on the base planks 28 without hindering the ability of operators to individually place and/or remove them.

Figure 4A:
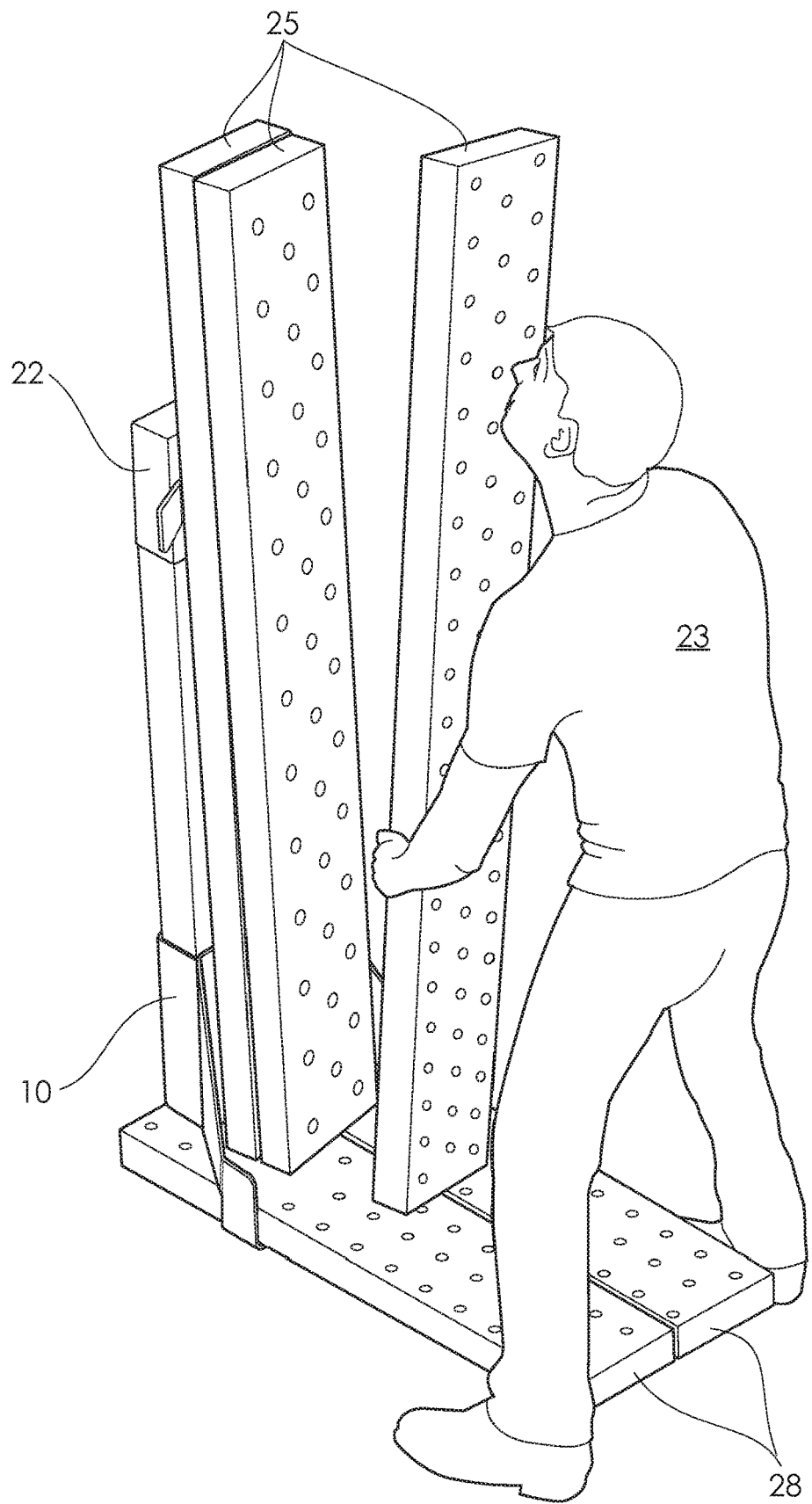
FIGS. 4A and 4B show the embodiment of FIG. 3 in use.
Figure 4B:
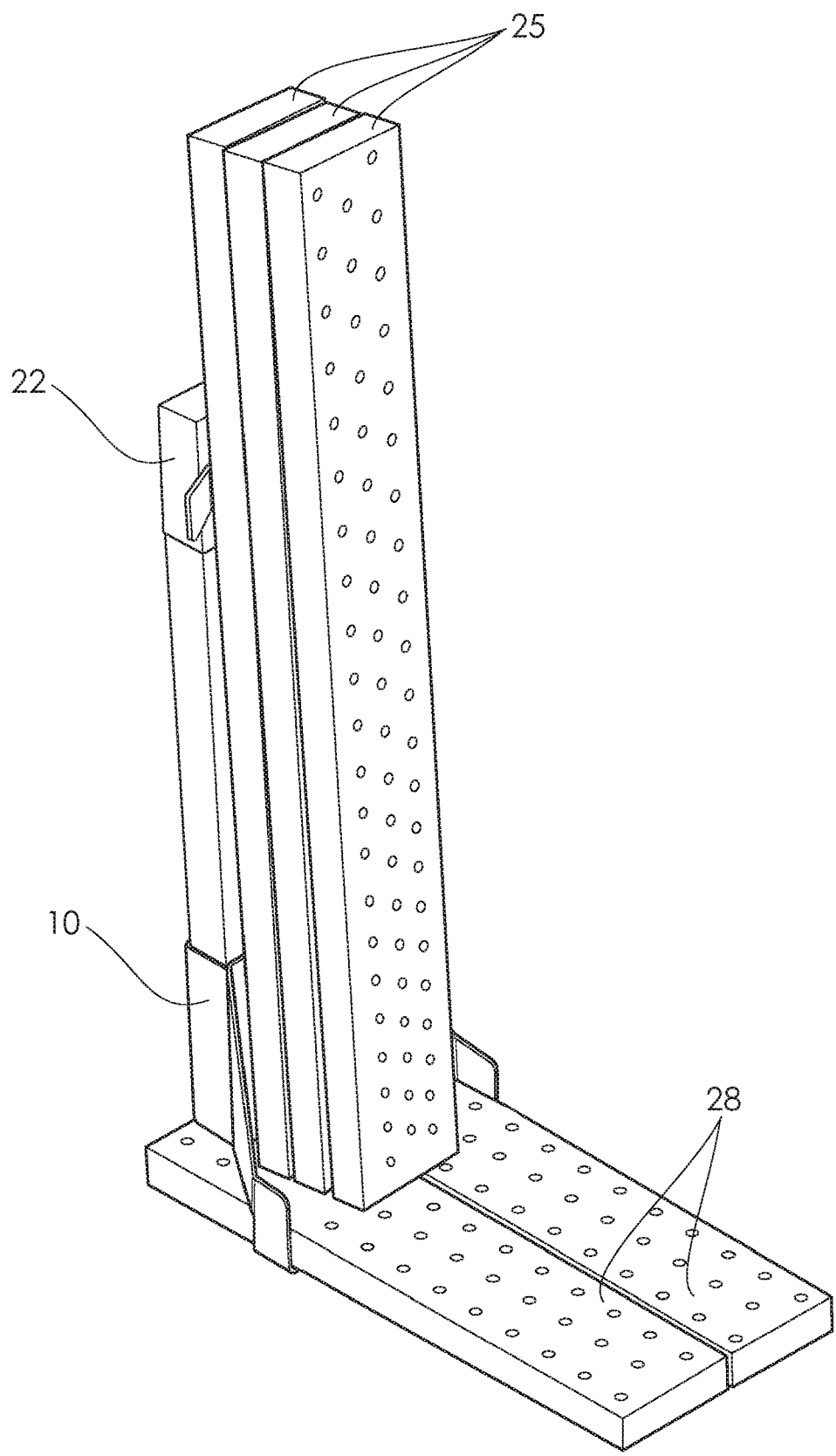

FIGS. 4A and 4B show respectively, an operator 23 stacking scaffolding planks 25, and the stacked planks resting the base planks 28 and against the end cap 22 of the stand or support apparatus of FIG. 3.

Figure 5A:
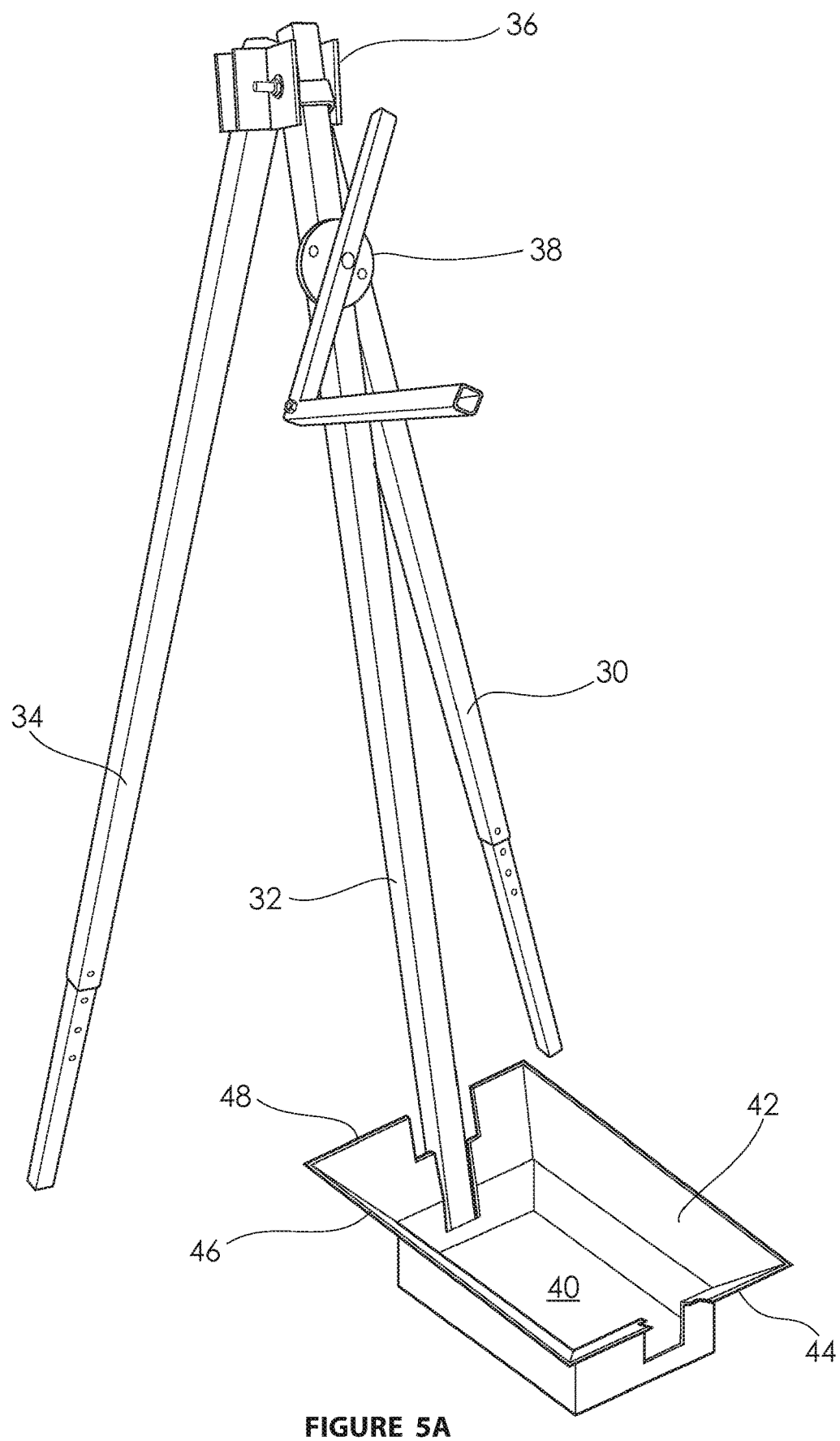
FIGS. 5A and 5B show an alternative embodiment of the stand or support apparatus for use on uneven surfaces.
Figure 5B:
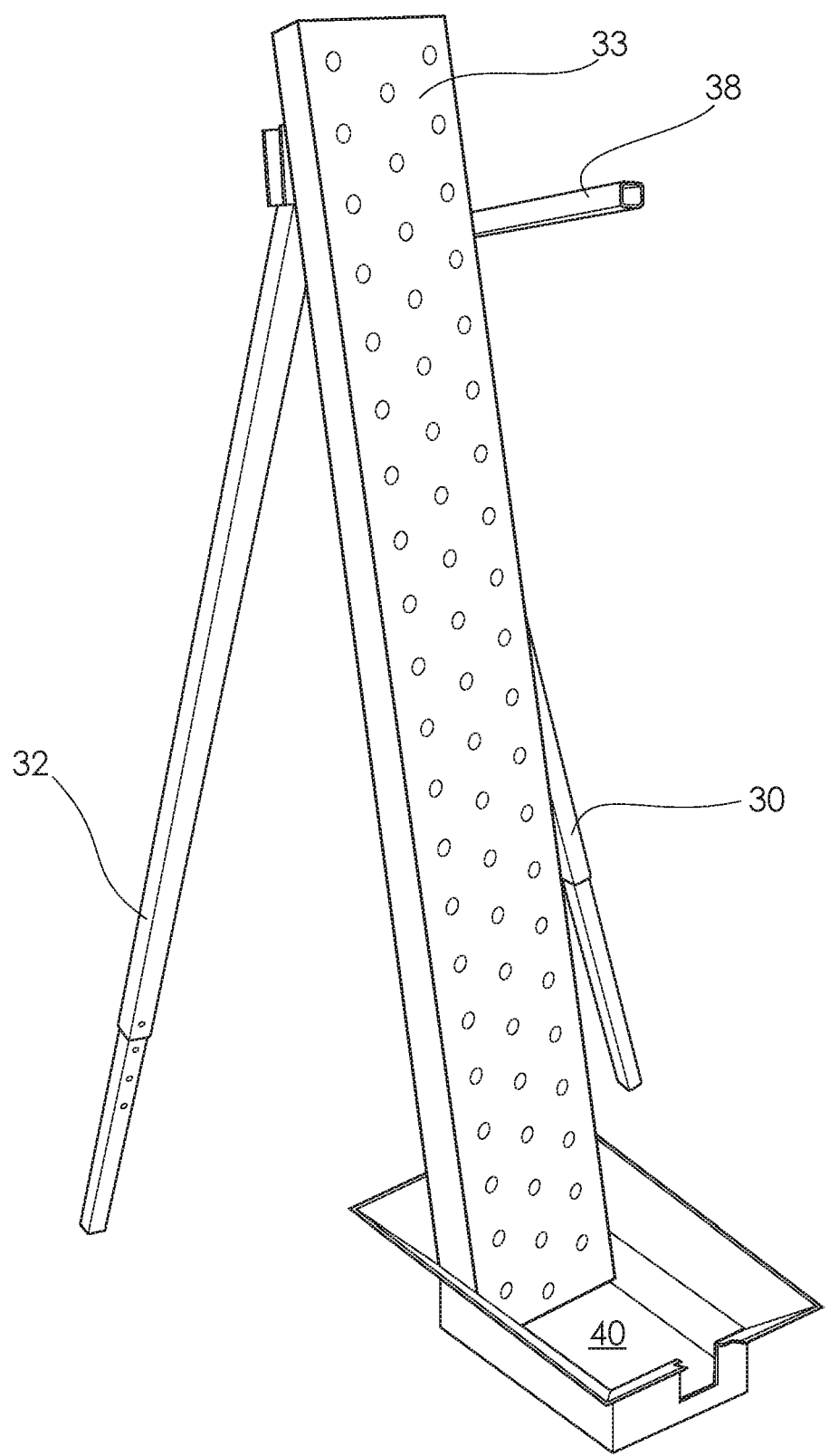

FIGS. 5A and 5B show an alternative embodiment of the invention. Wherein the previous embodiments are appropriate for use in environments wherein the floor or ground is substantially flat, it can be appreciated that this is not always the case. The embodiment shown in FIG. 5 addresses the issue of uneven ground, such as would be found in new construction sites. In the embodiment shown, three legs 30, 32, 34 comprise the base, and are pivotably connected to a central mounting boss 36 (that comprises the demounting connector). The legs may be pivoted inwardly into a storage configuration, whereby the overall profile of the apparatus is substantially reduced and the apparatus becomes compact and easier to store and transport. The legs can also be pivoted outwards as shown so as to be splayed into the self-supporting configuration, whereby the legs form a tripod base.

The embodiment shown in FIGS. 5A and 5B also includes a rotatable support 38. Support 38 is positionable, such that when the legs are collapsed into the storage configuration, support 38 may be rotated to substantially align with the collapsed legs, thereby attaining a reduced profile. Leg 32 also includes a component rest tray 40 at a point below support 38. Tray 40 features guides 42, 44, 46, 48 to assist the guiding and placement of a temporary construction element 33 in the tray 40.

Figure 6A:
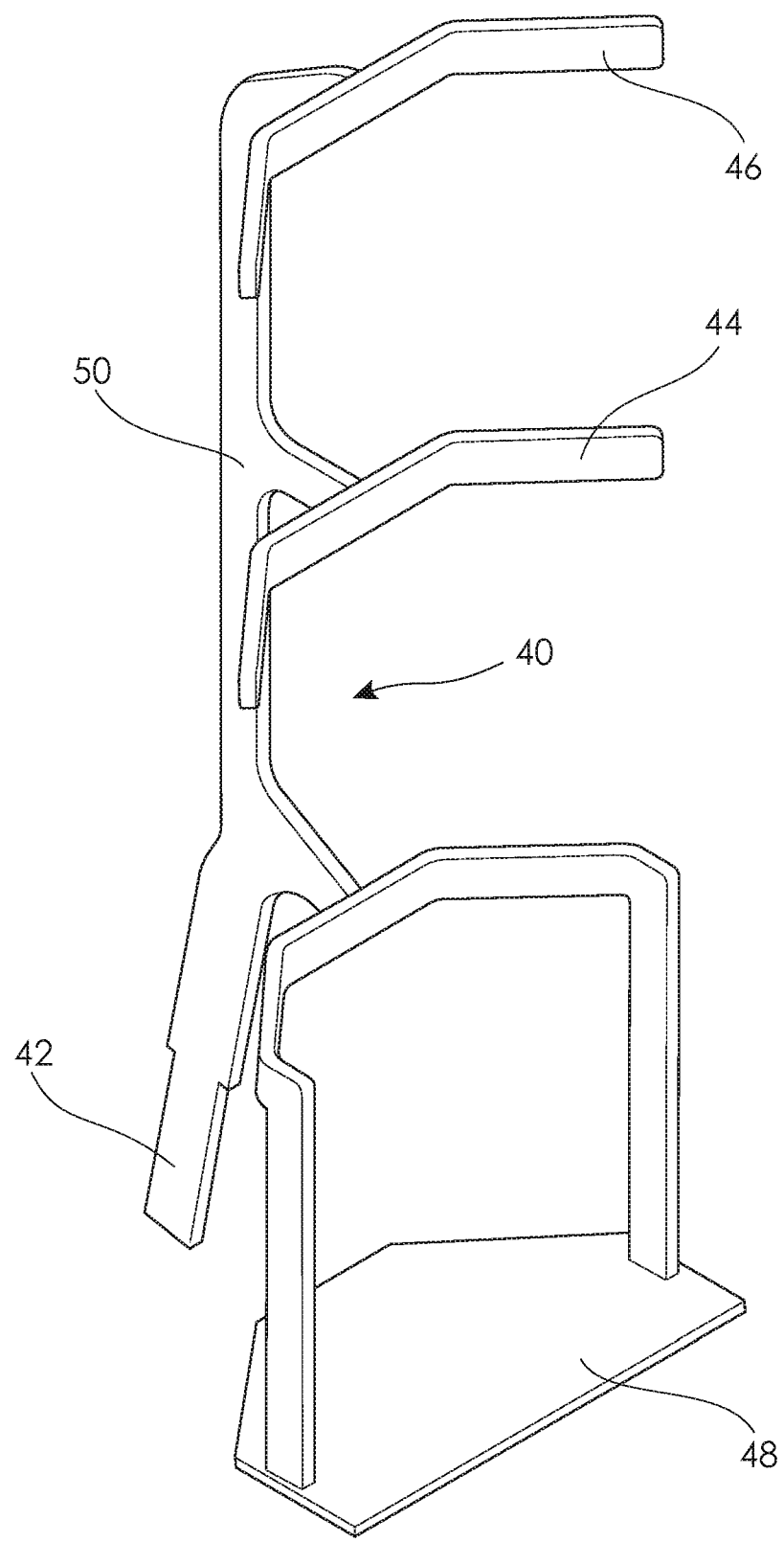
FIGS. 6A and 6B depict an embodiment adapted to provide construction elements in an elevated or raised position.
Figure 6B:
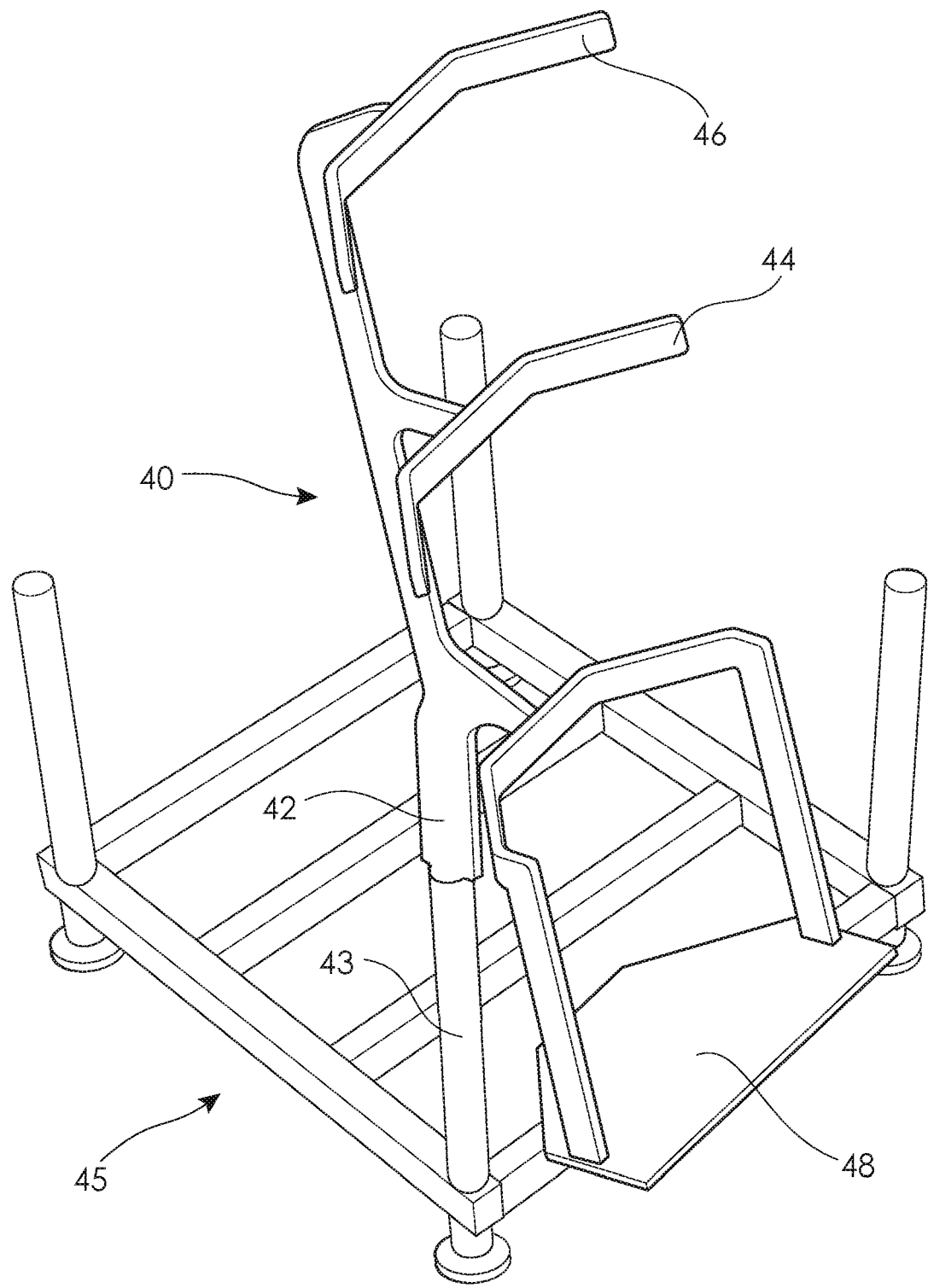

FIGS. 6A and 6B show a preferred embodiment of the invention comprising a support 40 with demounting connector arm or tang 42 which attaches support 40 to an upright tube (shown as 43 in FIG. 6B) of the scaffold delivery pallet 45 comprising the base.

Support 40 has a number of component rests 44, 46 positioned along its length. Support 40 additionally includes a support platform 48 for resting construction elements at an elevated or raised height.

In operation, a number of temporary construction elements may be placed such that their lower ends rest upon support platform 48 while leaning against component rests 44, 46.

Component rests 44, 46 are positioned such that they are purposely spaced from each other and distanced slightly away from support arm 50. This is an innovative design feature whereby once a number of temporary construction elements are placed against the component rests 44, 46, the space between the component rests and the support arm 50 permits an operator's arm to wrap around a bundle of temporary construction elements to more easily lift them off the support platform 48.

Figure 7A:
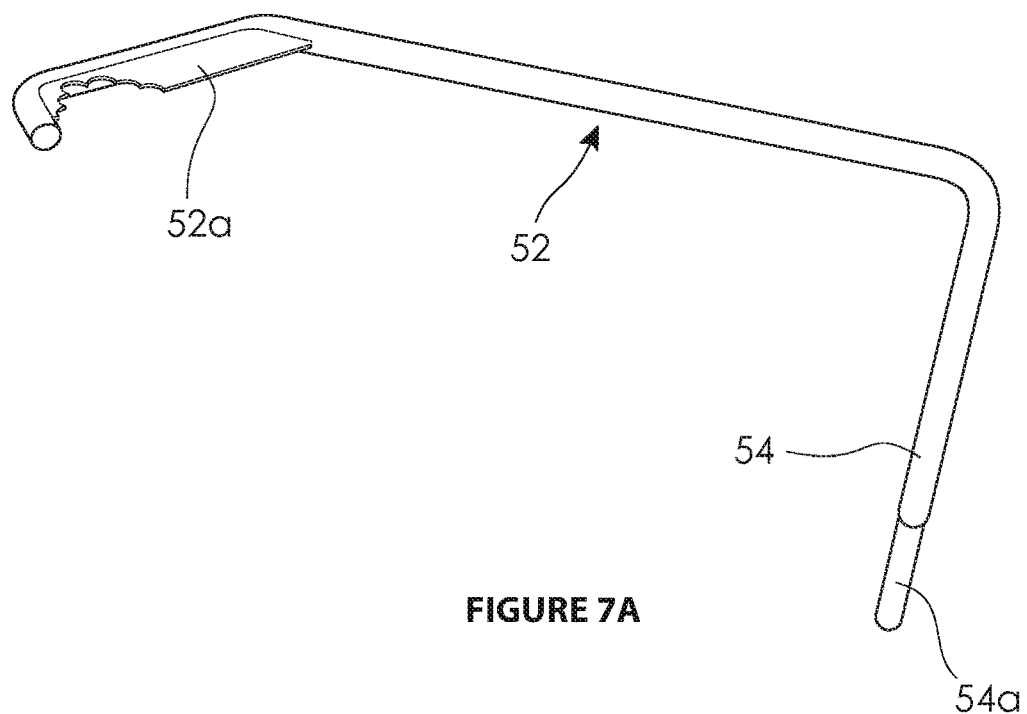
FIGS. 7A to 7C depicts a preferred embodiment for use with larger or longer construction elements.
Figure 7B:
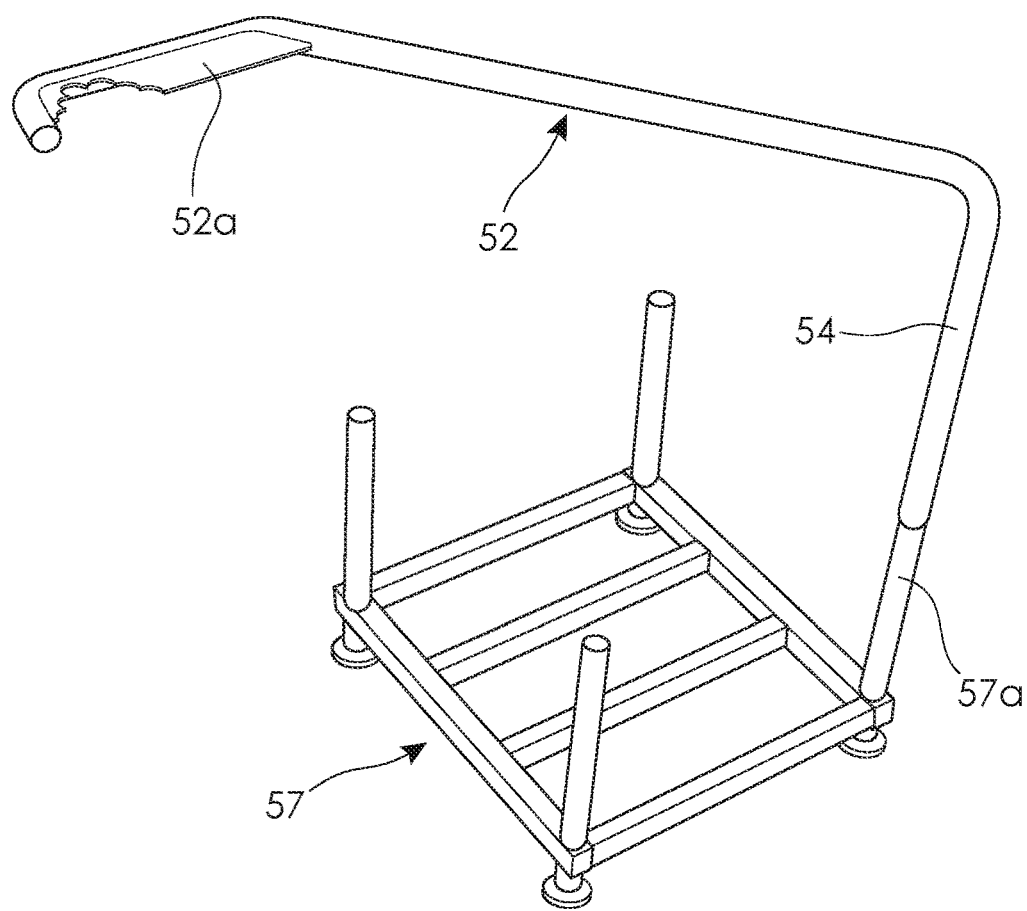
Figure 7C:
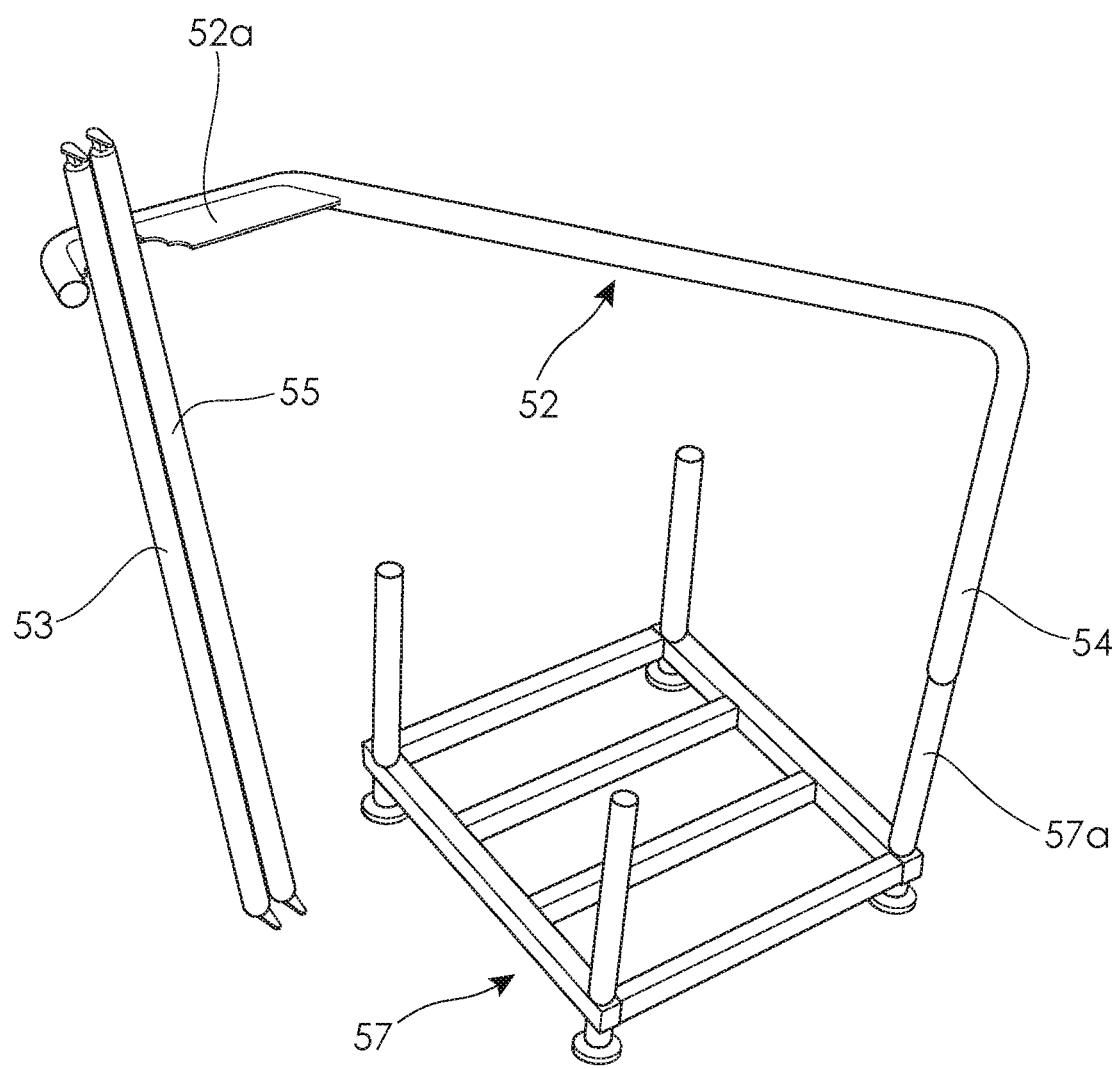

FIGS. 7A-7C show a preferred support 52 adapted for use with longer or larger construction elements 53, 55.

Demounting connector 54 comprises a vertical stub post 54a adapted to be inserted into an upright tube 57a of a scaffold delivery pallet 57 which comprises the base. Preferably, the support 52 extends outwards from vertical post 54 such that when the apparatus is mounted on scaffold delivery pallet 57, support 52 extends substantially horizontally with respect to the base.

Attached to support 52 is a component rest 56 that extends at an angle from the end of support 52. The component rest 56 is also positioned so as to be substantially horizontal relative to the scaffold delivery pallet (not shown).

In operation, a number of construction elements, shown here as scaffolding poles 53, 55 may be leant against the inside curve of the component rest 52a. In a most preferred embodiment, the curve of the component rest 52a is shaped or configured so as to restrict lateral or sideways movement of construction elements leaning against it. In this example, component rest 52a has a scalloped portion to hold poles 53, 55 and a flat portion to support planks (not shown).

In a further preferred embodiment, component rest 52a is capable of rotating about the horizontal axis of support 52. The purpose of this is to permit the apparatus to be arranged so as to lay flat when not in use, thus making the apparatus easier to transport and store. It is preferred that a locking mechanism is incorporated into support 52 so as to lock component rest 52a in position during use to avoid rotation.

It is also preferred that a locking mechanism is incorporated into the demounting connector 54a to prevent the entire apparatus from rotating about the base 57. The locking mechanisms may comprise a spring-loaded locking pin to engage appropriately positioned holes. A skilled person will however appreciate that there are multiple methods of inhibiting rotation of the relevant parts.

In this specification, unless the context clearly indicates otherwise, the term "comprising" has the non-exclusive meaning of the word, in the sense of "including at least" rather than the exclusive meaning in the sense of "consisting only of". The same applies with corresponding grammatical changes to other forms of the word such as "comprise", "comprises" and so on.

It will be apparent that obvious variations or modifications may be made which are in accordance with the spirit of the invention and which are intended to be part of the invention, and any such obvious variations or modifications are therefore within the scope of the invention.

INDUSTRIAL APPLICABILITY

The present invention as disclosed is applicable to any industry that utilises formwork, falsework or scaffolding and is particularly applicable for use in the building and construction industry.

The invention claimed is:

1. A temporary construction element support apparatus comprising:
   a first plank;
   a second plank;
   a third plank;
   an upper end cap defining an upper slot shaped to receive an upper end of the third plank and be retained thereupon;
   at least one cap guide element coupled to the upper end cap;
   a demountable connector including:
      a first slot extending in a horizontal direction, the first slot shaped to receive the first plank and the second plank side-by-side so as to form a base of the support apparatus;
      a second slot arranged to extend upwardly from the formed base, the second slot shaped to receive an end of the third plank so as to form a support of the support apparatus; and
      at least one outwardly-extending guide element; and
      wherein at least a portion of said base that is formed by said first and second plank extends underneath a lower end of the second slot, such that the bottom end of the third plank, when received by the second slot, is positioned above said base.

2. The temporary construction element support apparatus of claim 1, wherein the cap guide element is curved so as to limit lateral movement of construction elements resting against the support.

3. The temporary construction element support apparatus of claim 1, wherein the cap guide element is bent so as to limit lateral movement of construction elements resting against the support.

4. The temporary construction element support apparatus of claim 1, wherein the cap guide element is shaped so as to limit lateral movement of construction elements resting against the support.

5. The temporary construction element support apparatus of claim 1, wherein the at least one outwardly-extending guide element is a first outwardly-extending guide element and is coupled to a first horizontal lug.

6. The temporary construction element support apparatus of claim 5, further comprising a second outwardly-extending guide element coupled to a second horizontal bracket lug such that the first plank and second plank are partially supported by the first horizontal lug and the second horizontal lug, respectively.

7. The temporary construction element support apparatus of claim 6, wherein the first slot is defined by a lower end of a rectangular tube defining the second slot, a portion of the at least one outwardly-extending guide element and the first horizontal lug, and a portion of the second outwardly-extending guide element and the second horizontal lug.

8. A kit for forming a temporary construction support, the kit comprising:
    a cap element comprising:
        a closed end tube having an interior sized and shaped for receiving one end of a first scaffolding plank;
        at least one guide element extending outward from the closed end tube; and
    a connector including:
        a rectangular tube having an interior sized and shaped for receiving an opposing end of the first scaffolding plank;
        a first guide element coupled to and extending away from the rectangular tube;
        a second guide element coupled to and extending away from the rectangular tube;
        a first bracket lug coupled to a lower portion of a free end of the first guide element;
        a second bracket lug coupled to a lower portion of a free end of the second guide element;
    wherein the first bracket lug, the second bracket lug, the free end of the first guide element, the free end of the second guide element, and an edge of the rectangular tube define a slot for receiving at least two scaffolding planks in a side by side manner.

\* \* \* \* \*